United States Patent [19]

Heins et al.

[11] 3,959,552
[45] May 25, 1976

[54] PROCESS FOR THE PRODUCTION OF CLEANING-RESISTANT NONWOVEN MATERIALS

[75] Inventors: Ferdinand Heins, Erkrath-Unterbach; Hellmut Striegler, Leverkusen, both of Germany

[73] Assignee: Bayer Aktiengesellschaft, Germany

[22] Filed: Nov. 11, 1974

[21] Appl. No.: 522,353

[30] Foreign Application Priority Data
Nov. 15, 1973 Germany............................ 2357068

[52] U.S. Cl................................ 428/290; 428/474; 428/500; 526/312
[51] Int. Cl.².................. B32B 27/04; C08F 226/02
[58] Field of Search.................... 428/290, 500, 474; 260/78.5 R, 80.73; 427/385

[56] References Cited
UNITED STATES PATENTS
3,719,517 3/1973 Gladstone et al.................. 428/500
3,900,674 8/1975 Levin............................... 260/80.73

FOREIGN PATENTS OR APPLICATIONS
950,153 2/1964 United Kingdom.............. 260/80.73
750,890 1/1967 Canada............................. 428/290

Primary Examiner—Cameron K. Weiffenbach
Assistant Examiner—R. Eugene Varndell, Jr.
Attorney, Agent, or Firm—Connolly and Hutz

[57] ABSTRACT

An aqueous dispersion of copolymers are used as binders for the production of optionally dry-cleanable nonwoven materials. The copolymers consist of copolymerized units of 1 – 2.5% by weight of N-methylol(-meth)acrylamide, 1 – 2.5% by weight of (meth)acrylamide, 0.5 – 3% by weight of $\alpha,\beta$-monoolefinically unsaturated di- or tricarboxylic acids with 4 to 6 carbon atoms and 89.5 – 97.5% by weight of (meth)-acrylic acid esters having 1 – 18 carbon atoms in the alcohol component.

3 Claims, No Drawings

PROCESS FOR THE PRODUCTION OF CLEANING-RESISTANT NONWOVEN MATERIALS

This invention relates to a process for the production of cleaning-resistant nonwoven materials using aqueous dispersions of copolymers of N-methylol-acrylamide and/or N-methylol-methacrylamide, acrylamide and/or methacrylamide, α,β-monoolefinically unsaturated dicarboxylic and/or tricarboxylic acids and, optionally, other monomers.

Nonwoven materials are being used to an increasing extend in the textile industry for the production of outer clothing. These materials are used both as stiffenings and as fillings. For example, they are used as a stiffening interlining in the front panels of jackets and coats. Nonwoven materials are also used as a filling or wadding in the production of anoraks and other articles of winter clothing.

Nonwoven materials of the kind in question have to meet stringent requirements in regard to care processes, especially dry cleaning. The material should not dissolve, lose its bulkiness, harden or become soft or lumpy. Neither should it lose its elastic properties or discolour. These requirements are largely imposed upon the binder by which the nonwoven material is held together.

Among the known binders for nonwoven materials, acrylate-based plastics dispersions are preferably used for the production of interlinings and fillings because they are the most resistant to cleaning.

However, it has been found that, in most cases, resistance to repeated dry cleaning is inadequate, as reflected in the fact that, after several cleaning cycles, the nonwoven material loses volume, becomes "fluffy" and loses its resilience.

If, at this stage, the nonwoven material is treated with a dye absorbed substantively by the binder, but not by the fibres, distinct differences in binder distribution and concentration, in comparison with the original nonwoven material dyed in the same way, are clearly apparent. In this way it becomes noticeable that, in the course of repeated cleaning, the binder is dissolved away, thus destroying the original cohesion of the constituent fibres of the nonwoven material.

Hitherto, it has been standard practice to use aqueous dispersions of copolymers containing, in addition to acrylic and/or methacrylic acid esters, monomers having reactive groups such as carboxyl or carbonamide groups (cf. German Auslegeschrift Nos. 1,135,413 and 1,129,449). These binders can then be crosslinked by the addition of components which react with the functional groups. However, attempts to consolidate nonwoven materials in this way have shown that the bonded materials generally lack the necessary resistance to solvents.

Accordingly, it is best to use dispersions of copolymers having autocrosslinking groups such as N-methylolacrylamide or N-methylolmethacrylamide or corresponding masked compounds which react with one another through pH-displacement and energy supply. It is possible in this way to obtain highly crosslinked products which, after prolonged condensation, provide the fibre-based nonwoven materials with generally adequate cleaning resistance.

Unfortunately, crosslinking can only be carried out at relatively high temperatures, with the result that sensitive fibres, such as wool, can easily be damaged. In addition, the impregnated or sprayed nonwoven materials are frequently not dried thoroughly enough, with the result that crosslinking often remains incomplete for this reason along, making it impossible to obtain satisfactory resistance to repeated dry cleaning and adequate processing properties.

Accordingly, attempts have been made to set the degree of crosslinking of the polymer at a high level during polymerisation itself by additionally polymerising monomers containing two polymerisable double bonds. According to German Auslegeschrift No. 1,277,191, laundry-stable and solvent-resistant nonwoven materials are obtained in this way. Unfortunately, this process is attended by the disadvantage of relatively long condensation times at relatively high temperatures. In addition, it is possible in accordance with German Offenlegungsschrift No. 2,012,287 further to reduce the crosslinking temperature by incorporating N-methoxymethylmethacrylamide and using a combination of acrylic and methacrylic acid with monomers containing two polymerisable double bonds without reducing the cleaning resistance of the nonwoven materials.

An object of the invention is to provide nonwoven materials of optimum cleaning resistance which can be dried and consolidated at extremely low temperatures and in extremely short condensation times with hardly any formaldehyde being given off.

According to the invention, this object is achieved by using, as binder, aqueous disperions of copolymers of at most 2.5% by weight of N-methylol acrylamide, or N-methylolmethacrylamide, at most 5% by weight acrylamide or methacrylamide, at most 3% by weight of an α,β-monoolefinically unsaturated dicarboxylic acid and/or tricarboxylic acid and acrylic or methacrylic acid esters, up to 50% by weight of the acrylic or methacrylic acid esters being replaceable by other monomers.

Using binders of this kind, it is possible to obtain highly cleaning-resistant, clothing-grade nonwoven materials in short condensation times and at relatively low temperatures, so that the application of binders of the kind in question represents a significant technical advance.

Accordingly, the invention provides a process for the production nonwoven materials of improved dry-cleaning resistance using aqueous dispersions of copolymers of N-methylol acrylamide, N-methylolmethacrylamide, acrylamide, methacrylamide, α,β-monoolefinically unsaturated carboxylic acids and, optionally, other monomers, in which the copolymers consist of copolymerised units of
  A. 1.0 to 2.5% by weight of N-methylol acrylamide, N-methylolmethacrylamide or a mixture thereof;
  B. 1.0 to 5% by weight of acrylamide, methacrylamide or a mixture thereof;
  C. 0.5 to 3% by weight of α,β-monoolefinically unsaturated dicarboxylic or tricarboxylic acids having 4 to 6 carbon atoms or mixtures thereof; and
  D. 89.5 to 97.5% by weight of acrylic or methacrylic acid esters having 1 to 18 carbon atoms in the alcohol component or mixtures thereof,
the total of (A), (B), (C) and (D) being 100%, and up to 50% by weight of component (D) being replaceable by α,β-monoolefinically unsaturated monomers other than those mentioned in (A) to (C).

It is preferred to use component (A) in quantities of from 1 to 2.1% by weight, component (B) in quantities of from 1 to 3% by weight, component (C) in quantities of from 0.5 to 1.5% by weight and component (D) in quantities of 100 − (A+B+C) % by weight.

Component (A) is preferably N-methylolacrylamide, component (B) is preferably acrylamide, component (C) is preferably maleic acid, fumaric acid, itaconic acid, citraconic acid or aconitic acid, or a mixture thereof, especially itaconic acid, and component (D) is preferably an acrylic or methacrylic acid ester having 1 to 8 carbon atoms in the alcohol component or a mixture of such esters, such as for example methyl(meth)acrylate, ethyl(meth)acrylate, n-propyl (meth)acrylate, isopropyl(meth)acrylate, n-butyl(meth)acrylate, isobutyl(meth)acrylate or 2-ethylhexyl(meth)acrylate.

Monomers other than those mentioned in (A) to (D) include $\alpha,\beta$-monoolefinically unsaturated monocarboxylic acids having 3 to 5 carbon atoms, such as acrylic and methacrylic acid; monoesters and diesters of aliphatic, monohydric alcohols having 1 to 8 carbon atoms or cyclohexanol, and $\alpha, \beta$-monoolefinically unsaturated dicarboxylic acids having 4 to 5 carbon atoms, such as maleic acid, fumaric acid, citraconic acid and itaconic acid; monesters of glycols having 2 to 4 carbon atoms and (meth) acrylic acid; vinyl esters of carboxylic acids having 1 to 18 carbon atoms such as vinylformate, vinylacetate, vinylpropionate, vinylbutyrate, vinyllaurate, vinylstearate; acrylonitrile, methacrylonitrile; vinyl chloride, vinylidene chloride; vinylalkyl ethers having 1 to 4 carbon atoms in the alkyl group, styrene, styrenes substituted in the nucleus by $C_1-C_4$-alkyl, $\alpha$-methylstyrene or mixtures thereof. It is preferred to use acrylonitrile or styrene or a mixture thereof.

The aqueous dispersions are prepared in known manner by emulsion polymerisation using emulsifiers. Anionic, cationic or non-ionic emulsifying or dispersing agent or combinations thereof are used for this purpose in a quantity of from 0.1 to 20% by weight (based on monomer).

Examples of anionic emulsifiers include higher fatty acids, resinic acids, higher fatty alcohol sulphates, higher alkylsulphonates and alkylarylsulphonates and their condensation products with formaldehyde, higher hydroxyalkylsulphonates, salts of sulphosuccinic acid esters and sulphated ethylene oxide adducts.

Examples of cationic emulsifiers are salts of alkyl, aryl-, and alkylaryl-amines with inorganic acids, salts of quaternary ammonium compounds, and higher alkylpyridinium salts.

Examples of suitable non-ionic emulsifiers include the known reaction products of ethylene oxide with fatty alcohols, such as lauryl-, myristyl-, cetyl-, stearyl- and oleyl-alcohol, with fatty acids such as lauric acid, myristic acid, palmitic acid, stearic acid and oleic acid, and their amides and alkylphenols, such as isooctyl, isononyl and dodecylphenol. Other suitable non-ionic emulsifiers are, for example, the reaction products of ethylene oxide with isononyl, dodecyl, tetradecylmercaptan and higher alkylmercaptans and higher alkylthiophenols or similar reaction products of etherified or esterified polyhydroxy compounds having a relatively long alkyl chain, such as sorbitan monostearate In every case, the compounds mentioned as examples are condensed with 4 to 60 mols or more of ethylene oxide. However, it is also possible to use block copolymers of ethylene oxide and propylene oxide with at least 1 mol of ethylene oxide.

Examples of suitable initiators include inorganic peroxo compounds such as hydrogen peroxide, sodium, potassium or ammonium peroxodisulphate, peroxocarbonates and borate peroxyhydrates, and also organic peroxo compounds such as acylhydroperoxides, diacylperoxides, alkylhydroperoxides, dialkylperoxides and esters, such as tert-butyl perbenzoate. The initiator is generally used in a quantity of from 0.01 to 5% by weight, based on the total quantity of monomers used.

The inorganic or organic peroxo compounds mentioned as examples can also be used in combination with suitable reducing agents such as, for example, sulphur dioxide, alkali metal disulphites, alkali metal or ammonium hydrogen sulphites, thiosulphate, hydrosulphite and formaldehyde sulphoxylate, and also hydroxylamine hydrochloride, hydrazine sulphate, iron(II) sulphate, tin(II)chloride, titanium(III)sulphate, hydroquinone, gluclose, ascorbic acid and certain amines such as polyalkylenepolyamines.

In many cases, polymerisation is best carried out in the presence of promoters such as, for example, small quantities of metal salts whose cations can exist in more than one valence state. Examples of such metal salts are copper, manganese, iron, cobalt and nickel salts.

Chain transfer agents, such as, for example, tetrachloromethane, trichlorbromomethane, tetrachlorethene, methallyl chloride, lower and higher alcohols, higher alkylmercaptans and dialkylxanthogenates can also be used during polymerisation. Polymerisation is best carried out st temperatures in the range of from 10 to 95°C and a pH of from 1 to about 9.

It is possible in this way to prepare dispersions having solids contents of from 1 to 70% by weight, although plastics dispersions, having solids contents of from 30 to 60% by weight are normally used.

The fibre-based nonwoven materials to be treated with these special binders can be prepared by wet-lay or by dry-lay processes. The nonwoven materials can be formed from continous filaments by irregular deposition on a conveyor belt (spunbonded web), or from staple fibres. In the second case, the nonwoven materials are formed by aerodynamical or mechanical means following opening of the fibres, resulting in the formation of random-layer nonwoven materials which can be produced, for example, on carding machines. The individual cardweb formed can be further processed, for example by means of a following crosslapper into a cross-laid nonwoven material. After doubling, with or without fibre reinforcement, the fibre-based nonwoven materials can be presolidified, for example by needlepunching, fulling and/or shrinkage, before the special binder described herein is applied to them.

The staple fibres can be natural, synthetic or mineral fibres or corresponding mixtures thereof. They can consist of wool, silk, casein, $\alpha$-protein, cellulose or modified cellulose, for example cellulose esters. The fibres can also consist of polyamide, polyester, polyacrylonitrile or copolymers of acrylonitrile with acrylates or other comonomers, and also of copolymers of vinyl chloride or vinylidene chloride with vinylacetate and acrylates, or of asbestos, glass or metal fibres.

Polyesters, polyacrylonitrile and rayon staple fibre, optionally in admixture with one another, are preferably used for nonwoven materials intended for use as a filling or interlining in outer clothing.

The dispersions can be applied to the nonwoven materials by known methods such as impregnation, foam impregnation, spraying, padding or printing.

After the dispersion has been applied and the excess binder, if any, has been subsequently removed, for example by squeezing, the impregnated nonwoven material is dried and condensed. Drying can be carried out over a period of from 1 to 10 minutes at temperatures of from about 100° to 170°C, whilst condensation can be carried out over a period of 0.5 to 3 minutes at temperatures in the range of from 110° to 160°C. If desired, condensation can also be carried out in the presence of acid catalysts such as, for example oxalic acid, phosphoric acid, magnesium chloride or ammonium oxalate, used in quantities of from 0.5 to 3% by weight, based on the solids content of the dispersions.

The fixed quantity of solid binder in the nonwoven material amounts to between about 15 and 30% by weight, based on the weight of the nonwoven material.

The parts and percentage contents quoted in the Examples relate to weight unless otherwise stated.

The copolymer dispersions used in the Examples and Comparison Tests can be prepared by the following general method, the percentages quoted in reference to the components being based on total monomer.

A small quantity, for example 0.1%, of ammonium dodecylbenzene sulphonate and part of the $\alpha,\beta$-monoethylenically unsaturated carboxylic acid, dissolved in water, are initially introduced into a vessel equipped with a stirrer, reflux condenser, thermometer and 3 dropping funnels, followed by the addition of a small quantity of the oil-soluble monomers, after which the mixture is heated to 60°C. Polymerisation is then initiated by the addition of a small quantity, for example 0.03%, of potassium peroxodisulphate and of the same quantity of sodium disulphite, followed by the continous addition over a period of at least 3 hours at 60°C of the following 3 feedings. The first feeding contains the rest of the oil-soluble monomers. The second feeding contains a small quantity, for example 0.1%, of potassium peroxodisulphate, dissolved in water. The third feeding contains the water-soluble monomers; the rest of the $\alpha,\beta$-monoethylenically unsaturated carboxylic acid; most, for example at least 3.5%, of the ammonium dodecylbenzene sulphonate; the non-ionic emulsifier, for example at least 2% of a reaction product of 1 mol of cetylalcohol with 50 mols of ethylene oxide; and a small quantity, for example 0.1%, of sodium disulphite. On completion of these 3 feedings, the mixture is stirred for 3 hours at 60°C, cooled and then adjusted with ammonia to pH 7.

The copolymers contain the polymerised units of the monomers in a substantially statistical distribution.

Copolymer A (according to the invention)

A copolymer dispersion is prepared from the following monomers by the general emulsion polymerisation process described above:
90 parts by weight of butylacrylate;
5 parts of weight of acrylonitrile;
2 parts by weight of N-methylolacrylamide;
2 parts by weight of acrylamide; and
1 part by weight of itaconic acid.
Solids content of the dispersion: approximately 35%, pH value: 7.

Copolymer B (according to the invention)

A copolymer dispersion is prepared from the following monomers in accordance with the general emulsion polymerisation method described above:
55 parts by weight of butylacrylate;
40 parts by weight of styrene;
2 parts by weight of N-methylolacrylamide;
2 parts by weight of acrylamide; and
1 part by weight of itaconic acid.
Solids content of the dispersion: approximately 30%, pH value: 7.

Copolymer C (comparison)

A copolymer dispersion, in which N-methoxymethylmethacrylamide (2 parts by weight) is used instead of the N-methylolacrylamide in copolymer A, is prepared by the general method described above.

Copolymer D (comparison)

The same as copolymer A, except that 1 part by weight of itaconic acid is replaced by 1 part by weight of methacrylic acid.

Copolymer E (comparison)

The same as copolymer A, except that it does not contain any acrylamide, but instead contains a larger quantity of butylacrylate.

Copolymer F (comparison German Offenlegungsschrift No. 2,012,287)

A copolymer dispersion is prepared from the following monomers by the general emulsion polymerisation method described above:
50.2 parts by weight of butylacrylate;
41.0 parts by weight of styrene;
5.0 parts by weight of N-methoxymethylmethacrylamide;
0.8 parts by weight of ethylene glycol-bis-methacrylate;
2.0 parts by weight of acrylic acid; and
1.0 part by weight of methacrylic acid.
Solids content: approximately 30%, pH value: 7.

EXAMPLE 1

A nonwoven material of a fibre mixture consisting of 80% of polyester fibres (crimped, white, delustred, 3.3 dtex, 80 mm staple) and 20% of regenerated cellulose fibres (crimped, white, delustred, 4.2 dtex, 60 mm staple) produced on a card with a following crosslayer in a weight per layer of 50 g/m², was impregnated with dispersions of copolymers A, C, D and E after adjustment to pH 2.5 with oxalic acid in 15% dilution. The material was freed from the excess dispersion by squeezing, dried for 5 minutes at 110°C and condensed for 30 seconds at 160°C. After cooling, the binder content was found to amount to about 19%. The consolidated nonwoven materials were called nonwovens A, C, D and E in accordance with the copolymers with which they were treated.

Samples of the nonwovens A, C, D and E to be compared were sewn into a black nonwoven material in the form of pieces measuring 10 × 10 cm² and were subjected to repeated (3 ×) dry cleaning with perchloroethylene under standard conditions. After each dry cleaning operation, a sample was taken. On evaluation of the samples, nonwoven A did not show any visible signs of having been affected. By contrast, nonwovens C and E were destroyed after only one dry cleaning operation, whilst nonwoven D showed signs of fibre separation along its edges. After three dry cleanings the structure of nonwoven D was also found to have suffered considerably.

The above comparison shows that it is only the binders with the composition according to the invention that give nonwoven materials which, after an extremely short condensation time at 160°C, are resistant to dry cleaning. Even the replacement of the dicarboxylic acid by a monocarboxylic acid, or the omission of the acrylamide or replacement of the methylol compound by the methylolether compound, is sufficient to give rise to a distinctly poorer chemical resistance. This is all the more surprising insofar as the aforementioned characteristic monomers themselves are only present in the copolymer in extremely small quantities.

EXAMPLE 2

A voluminous nonwoven material (cross-section about 1 cm, weight 100 g/m$^2$) was produced in known manner on a card with a following crosslayer from polyester fibres (5.8 dtex, 60 mm staple, white delustred, crimped) and was sprayed on both sides with a (20%) dispersion of copolymers B and F adjusted to pH 2.5 (oxalic acid). After drying for 3 minutes at $t =$ 120°C and condensation for 1 minute at 140°C, a 10 g/m$^2$ covering of dry binder was obtained on each side of the nonwoven material.

Samples of the two nonwoven materials to be compared were sewn in as described in Example 1, and were repeatedly treated with perchloroethylene. The samples were evaluated after 5 cycles. Whereas nonwoven B had withstood all the cleaning cycles without any damage, nonwoven F was affected after only 3 cycles, as reflected in the separation of individual fibres and in the formation of local "fluffy" accumulations.

The nonwoven F, which was highly resilient at the start of the experiment, had noticeably lost some of its springiness and bulkiness. The process of fibre separation became even more advanced with the 5th cleaning cycle. The damage which nonwoven F had suffered was demonstrated optically by colouring the nonwoven materials with Ceresblau GN (Colour Index Solvent Blue 63) in solution in methanol, the dye being absorbed quantitatively by the binder, but not by the fibres. Colouring showed that the binder of nonwoven F was dissolved away to an ever increasing extent during the cleaning cycles, whilst nonwoven B underwent hardly any loss of binder.

We claim:

1. A process for the production of a nonwoven material of improved dry-cleaning resistance, in which a nonwoven material is treated with an aqueous dispersion of a copolymer consisting of copolymerised units of
    A. 1.0 to 2.5% by weight of N-methylolacrylamide, N-methylolmethacrylamide, or a mixture thereof;
    B. 1.0 to 5% by weight of acrylamide, methacrylamide, or a mixture thereof;
    C. 0.5 to 3% by weight of at least one $\alpha,\beta$-monoolefinically unsaturated dicarboxylic or tricarboxylic acid having 4 to 6 carbon atoms; and
    D. 89.5 to 97.5% by weight of at least one acrylic or methacrylic acid ester having 1 to 18 carbon atoms in the alcohol component, up to 50% by weight of component (D) being replaceable by at least one $\alpha,\beta$-monoolefinically unsaturated monomer other than those mentioned in (A) to (C).

2. The process as claimed in claim 1, wherein component (C) consists of maleic acid, fumaric acid, itaconic acid, citraconic acid or aconitic acid.

3. The process as claimed in claim 1, wherein component (A) consists of N-methylolacrylamide, component (B) consists of acrylamide and component (C) consists of itaconic acid.

* * * * *